S. M. COLBURN.
VEHICLE TANK INDICATOR.
APPLICATION FILED JULY 28, 1917.
1,283,082.
Patented Oct. 29, 1918.
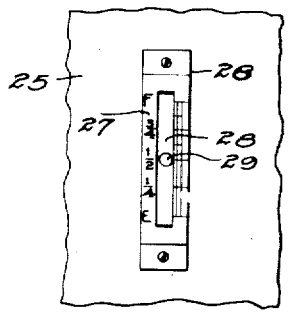
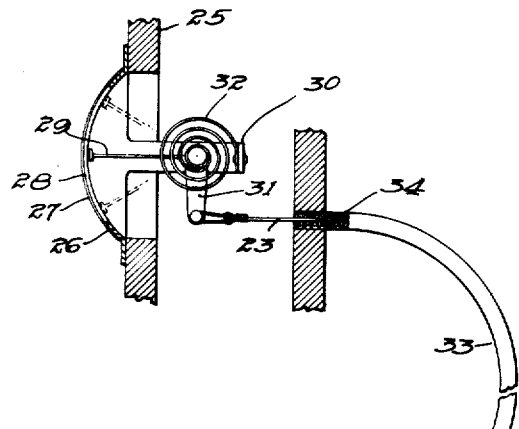
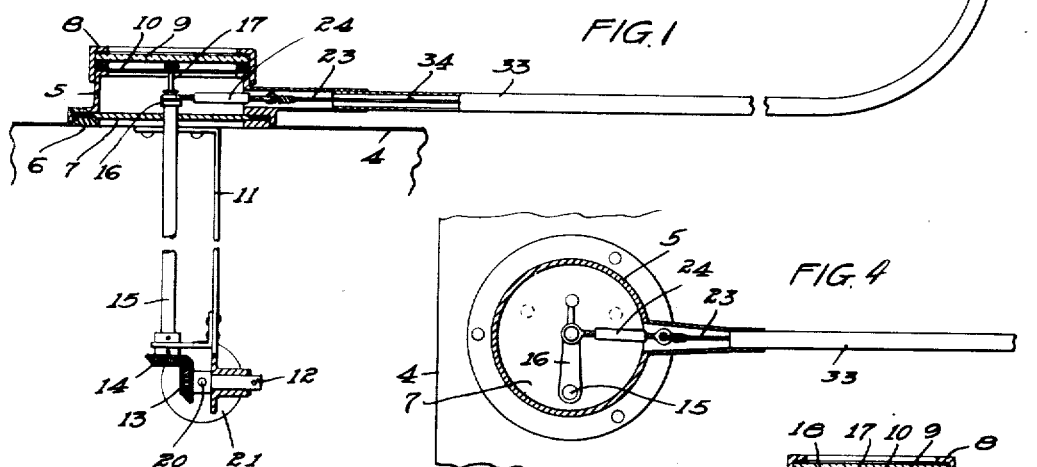
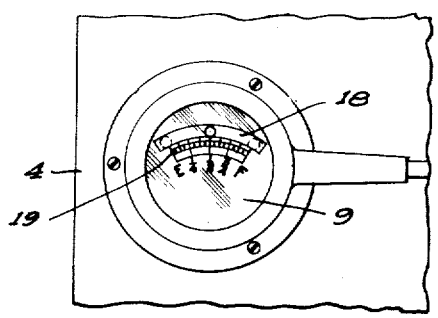
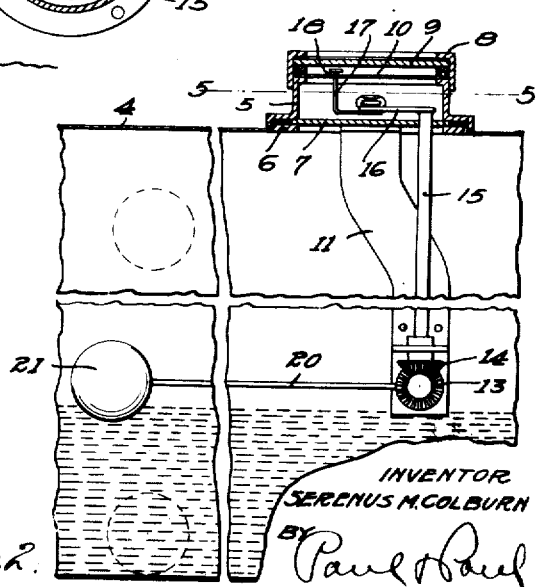
WITNESSES
INVENTOR
SERENUS M. COLBURN
BY Paul & Paul
ATTORNEYS

UNITED STATES PATENT OFFICE.

SERENUS MILO COLBURN, OF MINNEAPOLIS, MINNESOTA, ASSIGNOR OF ONE-HALF TO FREDERICK KEES, OF MINNEAPOLIS, MINNESOTA.

VEHICLE-TANK INDICATOR.

1,283,082.  Specification of Letters Patent.  Patented Oct. 29, 1918.

Application filed July 28, 1917. Serial No. 183,261.

*To all whom it may concern:*

Be it known that I, SERENUS M. COLBURN, a citizen of the United States, resident of Minneapolis, county of Hennepin, State of Minnesota, have invented certain new and useful Improvements in Vehicle-Tank Indicators, of which the following is a specification.

In the construction of an automobile of an up-to-date type, the fuel tank is arranged at the rear of the car, not only for convenience in filling but for obtaining a more uniform distribution of the load. It has been customary to arrange an indicator on the dash in front of the driver, from which he can determine at a glance the amount of fuel in the tank located under or adjacent the dash, but with the tank in the rear of the car the mounting of the indicator on the dash has not been practicable on account of the distance from the tank and the difficulty of accurately transmitting motion through a mechanism to register the varying levels of the fuel.

The object, therefore, of my invention is to provide an indicating device by means of which the level of the liquid in the tank at the rear of the car may be accurately registered on the dash in front of the driver.

A further object is to provide a duplex arrangement of indicators, one on the tank and one on the dash, operating simultaneously to indicate the amount of fuel in the tank to a person in the rear of the car as well as the driver.

Other objects of the invention will appear from the following detailed description.

The invention consists generally in various constructions and combinations, all as hereinafter described and particularly pointed out in the claims.

In the accompanying drawings forming part of this specification,

Figure 1 is a detail sectional view, showing the indicating devices embodying my invention and the transmitting means between them, Fig. 2 is a detail sectional view of the tank and the indicating device mounted thereon, Fig. 3 is a plan view of a portion of the tank and the indicator thereon, Fig. 4 is a view taken on the section line 5—5 of Fig. 3, Fig. 5 is a detail view of the indicator on the dash.

In the drawing, 4 represents a fuel tank at the rear of the car. Mounted on the tank 4 is a ring 5 having a flanged edge between which and the ring 6 on the tank a disk 7 is held. A cap or cover 8 is provided for the ring 5 and a transparent disk 9 is held between the cap 8 and the ring 5. A dial 10 is mounted in the ring 5 and graduated to indicate empty, quarter, half, three-quarters and full. Within the tank is a hanger 11 having a shaft 12 at its lower end provided with a beveled gear 13 meshing with a similar gear 14 on the lower end of an upright shaft 15. The upper end of this shaft is provided with an arm 16 and an indicator 17 is mounted on said arm and provided with an upwardly turned end to travel back and forth in a curved slot 18 provided in the disk 10, there being suitable graduations 19 adjacent to said slot indicating when the tank is empty and a quarter, half, or three quarters full and when entirely full, the height of the fuel in the tank determining the position of the indicator on the graduations. An arm 20 is mounted on the shaft 12 and carries a float 21 which rests upon the liquid in the tank, rising and falling with the varying levels thereof. If the tank is empty, the float will drop down upon the floor. When the tank is half full, the float will assume a substantially horizontal position, as shown in Fig. 3, and rise to a point near the top of the tank when the tank is full.

For transmitting the movement of this device to an indicator on the dash. I provide an arm 16 mounted on the shaft 15 and having a loose connection at one end with flexible means, such as a wire 23 for transmitting movement of the float, said wire being provided with a turn-buckle 24 by means of which any slack due to wear of the parts may be taken up and the indicator may be adjusted to its proper position. By means of this turn-buckle the indicator may be adjusted to its proper starting point.

On the dash 25 is a second indicator 26 having a graduated dial 27 and slot 28 in which the pointer 29 is mounted to swing. A bracket 30 is provided in the rear of the indicator, whereon an arm 31 is pivoted and carries the indicator 29. The arm 31 is loosely connected to the other end of the wire 23 and a coiled spring 32 is attached at one end to said arm and at the other end to the bracket 30 and the tension of this spring normally draws the wire taut, taking up all the slack therein so that the slightest movement of the indicator on the tank will be instantly transmitted to the indicator on the dash.

The particular function of the spring 32 is to keep the wire or flexible connection 23 under tension, so that it will transmit movement to the indicating device on the dash in substantially the same manner and with the same degree of accuracy as a rigid connection would do.

To protect the flexible connection or wire 23 I provide a tube 33 and to eliminate friction as far as possible I line this tube with a suitable wool, cotton, or linen fabric 34, on which the wire will slide easily with comparatively little friction.

This transmission of the movement of the indicator on the tank with practically no loss by friction with the indicator on the dash I regard as an important feature of the invention. The tube may of course, be made of other material and it may not, in all instances, be necessary to line it with a fabric, but I have found it to be an effective and comparatively inexpensive construction to obtain the desired result, namely, the elimination as far as possible of friction in the connections between the two indicators, thereby insuring simultaneous accurate movement of both of them. This tube in which the flexible connection is mounted is preferably carried along near one of the side rails of the car, and is then turned upwardly and backwardly through the dash to a convenient point of attachment to the dash indicator. This tube or pipe may be varied in length, according to the size and style of car on which it is used and it may, of course, be mounted in different positions without affecting its functions.

There are various advantages arising from the use of this duplex arrangement of indicators. In filling the tank, the person in charge can, at a glance, tell how much oil is in the tank and the driver, without turning his head, can ascertain the exact amount that is put in and, knowing the capacity of the tank and the level of the oil therein when the filling operation began, can check the person filling and readily determine how much oil is being put in the tank.

I claim as my invention:

1. In combination, with a power propelled vehicle and a fuel supply tank on the rear thereof, an indicating device mounted on the forward portion of the vehicle and including an operating arm, a flexible connection attached at one end to said arm, a spring mounted to oscillate said arm and normally hold said flexible connection under tension, a float arranged in said tank and a second arm movable with said float and attached to the other end of said flexible connection, whereby movement of said float will be transmitted accurately through said flexible connection to said indicating device.

2. In combination, with a power propelled vehicle and a fuel tank on the rear thereof, and a float device for indicating the level of the fuel in said tank, an indicator mounted on the forward portion of said vehicle, an oscillating arm connected with said indicator, a flexible connection leading from said oscillating arm to said float for transmitting the movement of said float to said arm, a spring connected with said arm for normally holding said flexible connection under tension, and a guide for said flexible connection having an inner textile fabric surface for contact with said flexible connection to reduce the friction between said guide and connection and insure accuracy of transmission of the movement of said float to said indicator.

3. In combination, with a power propelled vehicle and a fuel supply tank on the rear thereof, an indicator mounted on the forward portion of the vehicle, a float for indicating the level of the fuel in said tank, a flexible means connected at one end to said float, an oscillating device connecting the other end of said flexible means with said indicator, a spring mounted to operate said oscillating device to tension said flexible means and move it lengthwise without coiling and transmit the movement of said float to said indicator.

4. The combination, with a power propelled vehicle and a liquid fuel supply tank mounted on the rear thereof, of duplex indicating devices mounted on said tank and on the dash of the vehicle respectively, a float arranged in said tank and connected with the indicator thereon for registering the height of the liquid in said tank, a wire leading from the indicator on said tank to the indicator on said dash for simultaneous movement thereof, and means for keeping said wire under tension and insuring a corresponding movement of said indicators, for the purpose specified.

5. The combination, with a power propelled vehicle and a fuel supply tank on the rear thereof, of an indicating device mounted on said tank and comprising a shaft having an arm thereon, and an indicator connected with said arm, a float within said tank and geared to said shaft, a second indicating device mounted on the dash of the vehicle and including an arm and indicator therefor, a flexible connection leading from the arm of one of said indicators to the arm of the other indicator, and means for keeping said flexible connection under tension, thereby insuring accuracy of movement of said indicators.

6. The combination, with a tank adapted to contain a supply of liquid, of a float mounted therein to rise and fall with the level of the liquid, an indicator connected with said float and located adjacent to said tank, a second indicator at a point remote from said tank, arms connected with said indicators respectively, a flexible connection between said arm for simultaneous movement thereof and said indicators, and means for keeping flexible connection under tension to insure corresponding movement of said indicators.

In witness whereof, I have hereunto set my hand this 24th day of July 1917.

SERENUS MILO COLBURN.

Witnesses:
E. V. LUND,
PERLEY W. BOWDITCH.